Figure 16:
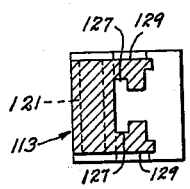

Jan. 28, 1964 R. C. MUELLER 3,119,114
STAPLING APPARATUS
Filed Nov. 15, 1961 5 Sheets-Sheet 1
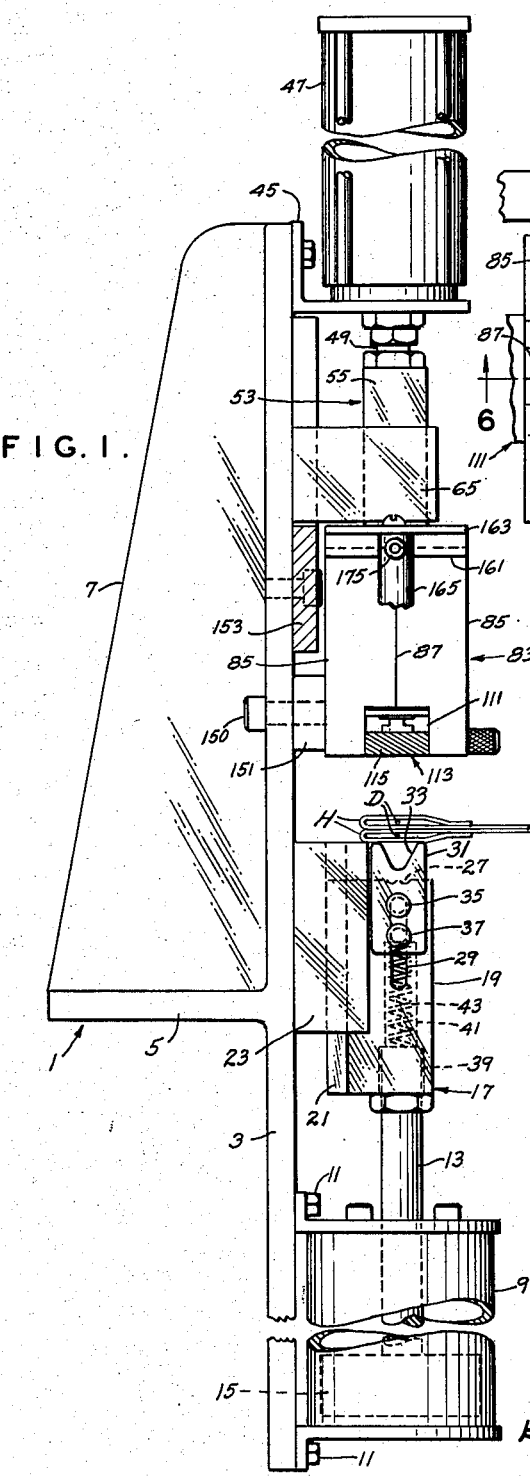
Robert C. Mueller,
Inventor.
Koenig, Pope, Senniger and Powers,
Attorneys.

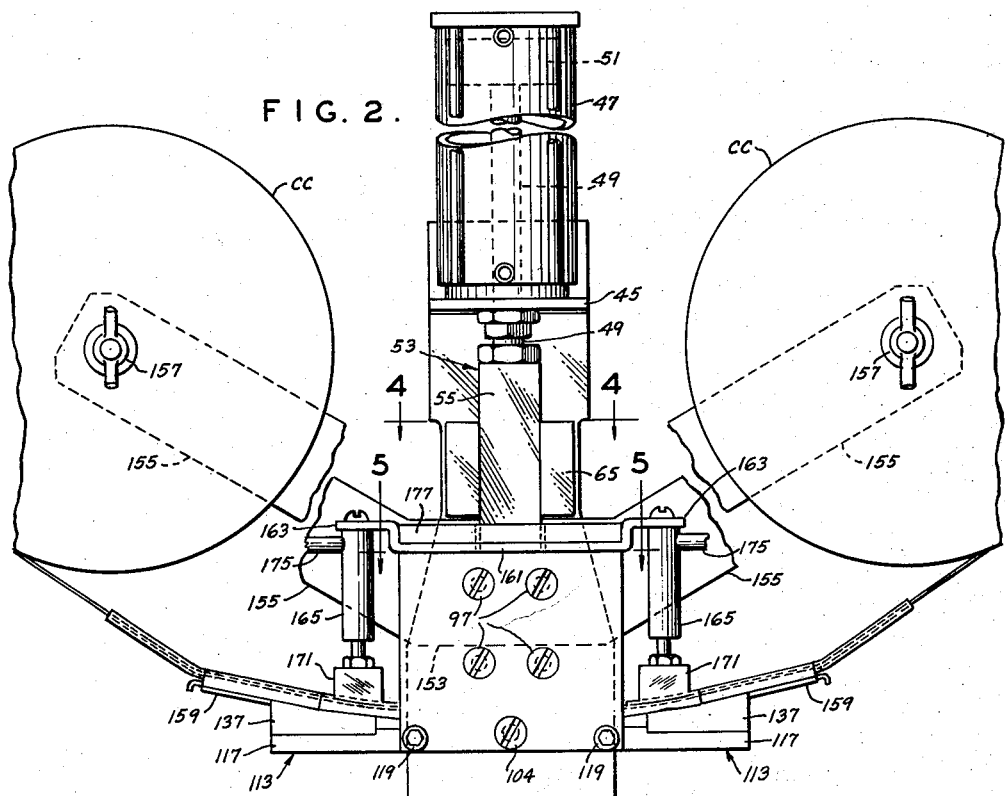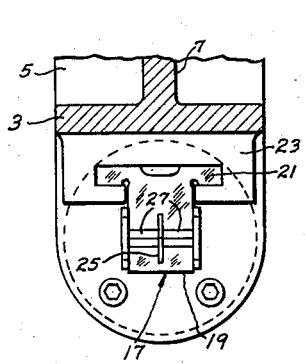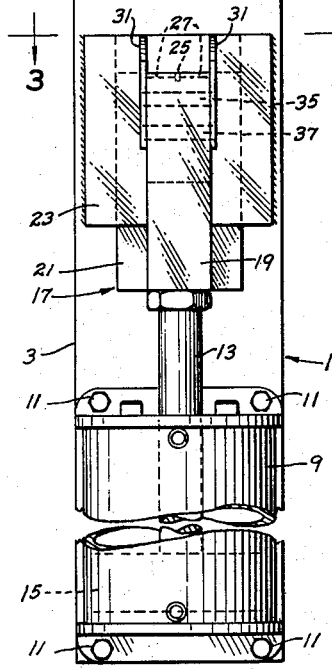

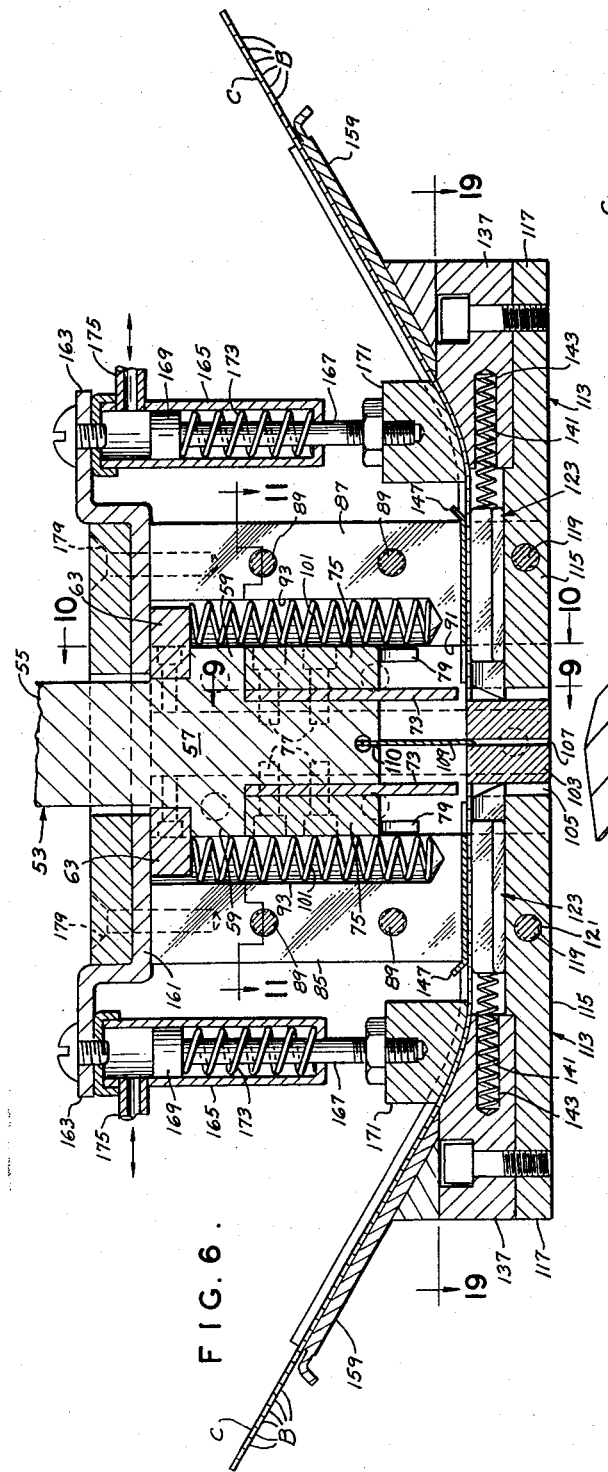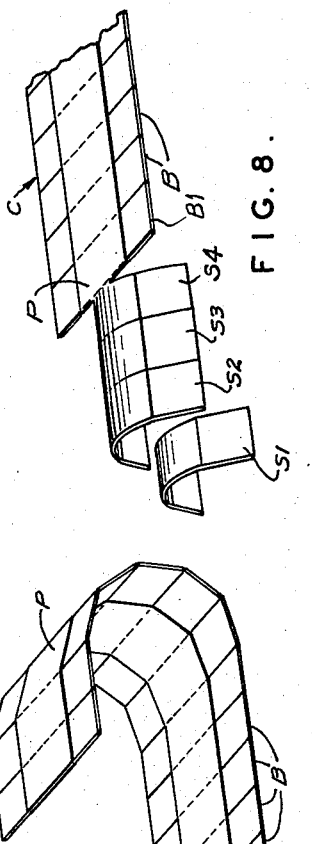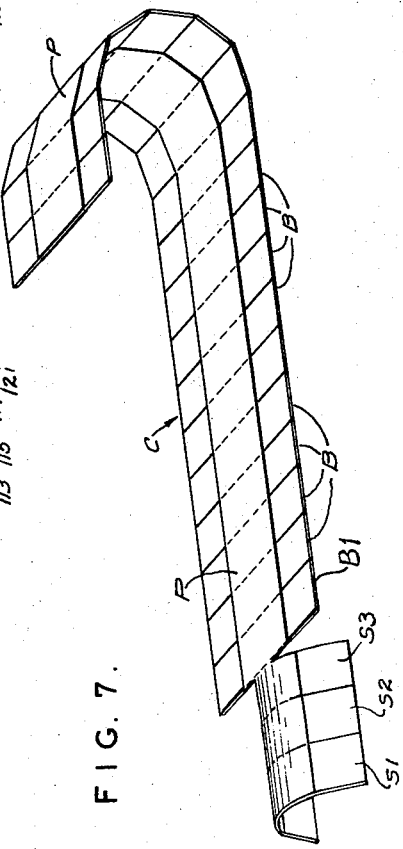

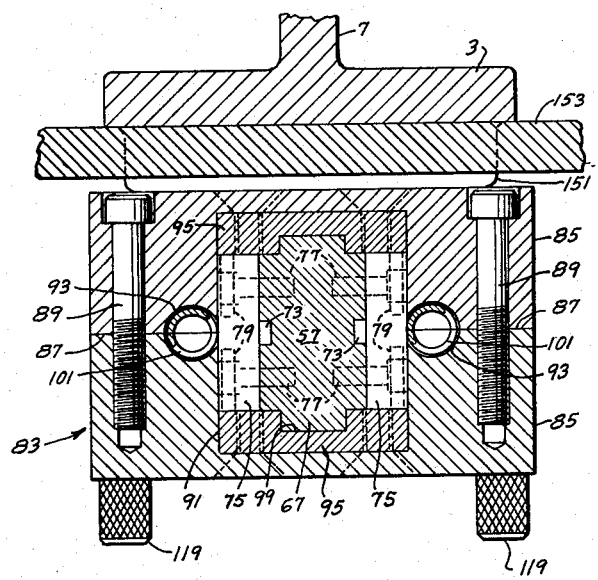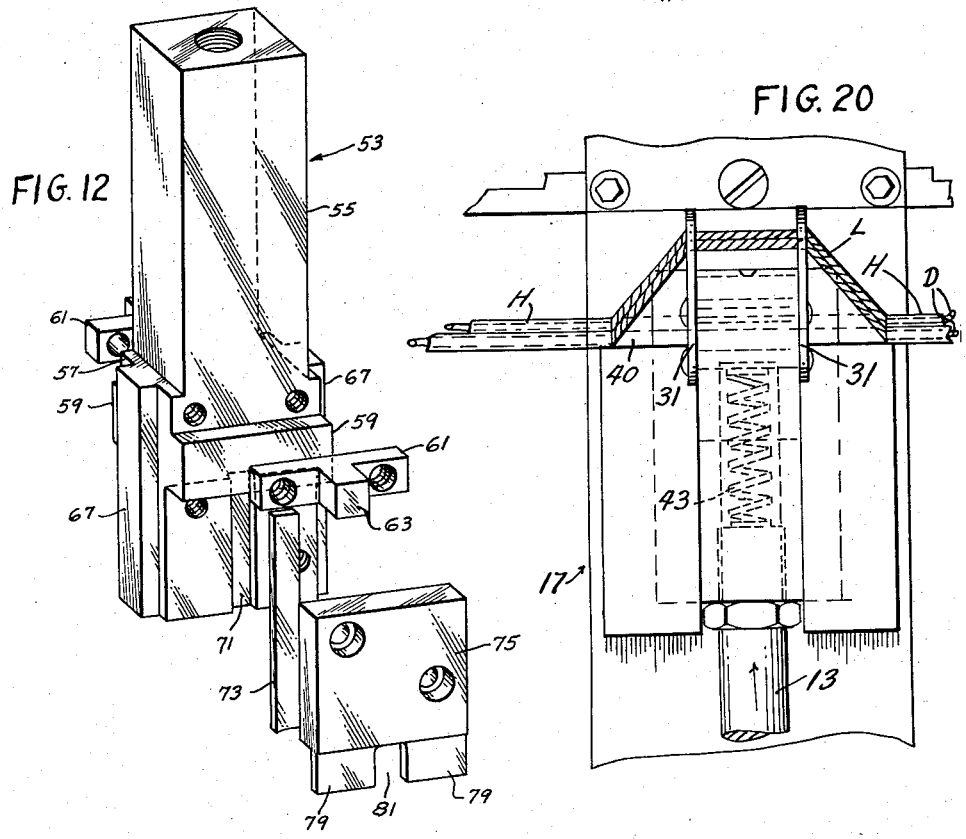

Jan. 28, 1964  R. C. MUELLER  3,119,114
STAPLING APPARATUS

Filed Nov. 15, 1961  5 Sheets-Sheet 5

United States Patent Office 3,119,114
Patented Jan. 28, 1964

3,119,114
STAPLING APPARATUS
Robert C. Mueller, Affton, Mo., assignor to Bemis Bro. Bag Company, St. Louis, Mo., a corporation of Missouri
Filed Nov. 15, 1961, Ser. No. 152,571
14 Claims. (Cl. 1—121)

This invention relates to stapling apparatus and more particularly to apparatus for stapling together the draw cords of a draw cord bag, though not limited to such use.

In U.S. Patent 2,897,729 there is shown apparatus for the manufacture of draw cord bags in which a center-folded heat-sealable web, i.e., a web folded along its longitudinal center line so as to have two superimposed walls joined by the fold along one edge, is intermittently fed forward one bag width interval at a time. As the web is fed forward, an open hem is formed along the other edge of each wall. Openings are then formed in the hems at bag width intervals. A draw cord is then introduced into each open hem, after which the hems are sealed. Means is provided for gathering portions of the two cords extending through the two hems exposed in each opening, pulling a loop including portions of both cords from the opening, severing the loop, and stapling together the portions of the two cords in the loop on opposite sides of the point where the loop is severed. Thereafter the web is heat-sealed and segmented on transverse lines spaced at bag width intervals and intersecting the openings to form draw cord bags in which there are two cords extending through hems at the top of the bag, the ends of the two cords projecting out from the hems and being stapled together.

This invention is particularly concerned with an improvement upon the means for gathering the cords, pulling the loop, severing the loop, and stapling the cords shown in said patent, among its several objects being the provision of apparatus for effecting these functions which assures absolute uniformity of the length of the staples (as is desirable for draw cord stapling), which better assures the gathering of the cords, which is adapted for higher speed operation, and which is more economical to construct and also to service, the construction being such as to enable easy and economical replacement of worn-out parts. It will be understood, however, that certain principles of the invention may be applicable to stapling in general. A primary feature of the apparatus of this invention is that it utilizes a chain of staple blanks, i.e., a chain of individual strips in which the strips extend transversely of the chain and are held together in the chain by a strip of adhesive, which enables each strip to be separated from the chain, and includes means for forming the blanks into U-shaped staples and clinching the staples. Other objects and features will be in part apparent and in part pointed out hereinafter.

The invention accordingly comprises the constructions hereinafter described, the scope of the invention being indicated in the following claims.

Figure 15:
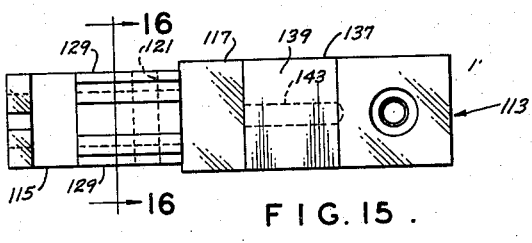
Figure 14:
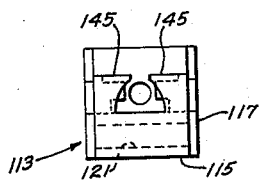
Figure 13:
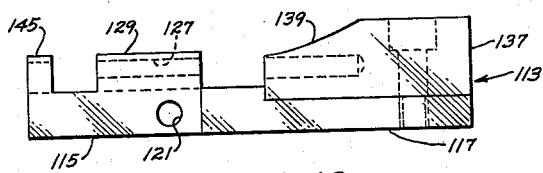
Figure 18:
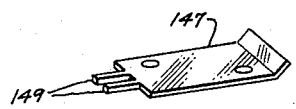
Figure 17:
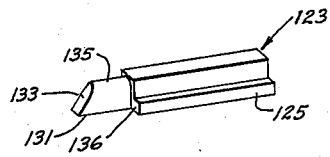
Figure 19:
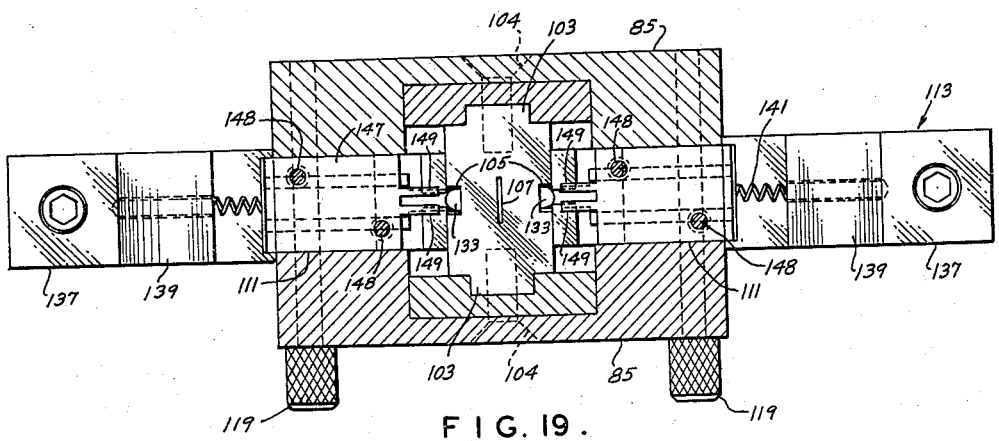

In the accompanying drawings, in which one of various possible embodiments of the invention is illustrated,
FIG. 1 is a side elevation of a stapling apparatus constructed in accordance with this invention, with parts broken away and shown in section;
FIG. 2 is a front elevation of the FIG. 1 apparatus, also with parts broken away;
FIG. 3 is a horizontal section taken on line 3—3 of FIG. 2;
FIG. 4 is a horizontal section taken on line 4—4 of FIG. 2;
FIG. 5 is an enlarged horizontal section taken on line 5—5 of FIG. 2;
FIG. 6 is a vertical section taken on line 6—6 of FIG. 5;
FIG. 7 is a perspective illustrating a chain of staple blanks such as used in stapling apparatus of this invention, showing three blanks at the leading end of the chain formed into U-shaped staples;
FIG. 8 is a view similar to FIG. 7 illustrating the driving of the end staple and the forming of the fourth staple blank into a U-shaped staple;
FIG. 9 is a fragmentary vertical section taken substantially on line 9—9 of FIG. 6;
FIG. 10 is a fragmentary vertical section taken substantially on line 10—10 of FIG. 6;
FIG. 11 is a horizontal section taken on line 11—11 of FIG. 6;
FIG. 12 is an exploded perspective of a plunger of the apparatus;
FIG. 13 is a side elevation of a certain guide per se;
FIG. 14 is a left end elevation of FIG. 13;
FIG. 15 is a plan of FIG. 13;
FIG. 16 is a section taken on line 16—16 of FIG. 13;
FIG. 17 is a perspective of a certain anvil per se;
FIG. 18 is a perspective of a certain stripper plate per se;
FIG. 19 is a horizontal section taken substantially on line 19—19 of FIG. 6; and
FIG. 20 is an enlarged fragment of FIG. 2 showing how a loop is pulled.

Corresponding reference characters indicate corresponding parts throughout the several views of the drawings.

Referring first to FIGS. 7 and 8 of the drawings, there is indicated at C a chain of staple blanks B such as is utilized in a stapling apparatus of this invention. Each blank B, as shown, comprises a thin narrow metal strip, adapted to be formed into a U-shaped staple. The chain consists of a series of such blanks B each extending transversely of the length of the chain, with the long sides of adjacent blanks in contiguous relation with one another, and with the blanks held together in articulated chain fashion by bands of plastic P extending throughout the length of the series on opposite faces of the series and sealed to the blanks. These bands of plastic P may, as shown, be narrower than the chain (i.e., the width of each band is less than the length of a blank) and are centered in respect to the longitudinal center line of the chain. The bands may be heat-sealable plastic bands, heat-sealed to the blanks. They may, for example, consist of strips of a plastic such as that sold under the trade name Mylar by E. I. du Pont de Nemours Co.

FIGS. 7 and 8 illustrate how staples are formed and driven by the stapling apparatus of this invention at the leading or forward end of a chain C of blanks B. As appears in FIG. 7, at the leading or forward end of the chain C, three staple blanks have been formed into U-shaped staples, these remaining attached to the chain. The staple at the forward end of the chain is designated S1. The next two staples are designated S2 and S3. The staple blank next to staple S3 is specially designated B1 (being the first blank in the series of blanks trailing staple S3). Then, as appears in FIG. 8, staple S1 is driven downward. It separates from the chain by tearing apart of the plastic bands P where staple S1 was articulated to staple S2, the plastic bands being sufficiently frangible for this purpose. As staple S1 is driven, blank B1 is formed into a staple S4. Staple S2 thereupon becomes the staple at the leading end of the chain with staples S3 and S4 the next staples in the chain. Then the chain is advanced forward to bring staple S2 into the S1 position for being driven on the next operation, to bring staple S3 into the S2 position, to bring staple S4 into the S3 position, and to bring the next blank B into the B1 position for being formed into a staple on the next operation.

FIGS. 1–6 and 9–20 illustrate an apparatus of this invention comprising means for simultaneously forming staples from two such chains C and simultaneously driving the two staples at the forward ends of the two chains around portions of draw cords D in a loop L pulled as previously described, clinching the staples around the cords, and cutting the cords between the two staples. First referring to FIGS. 1 and 2, the apparatus is shown to comprise a main frame generally designated 1 consisting of a vertical plate 3 having a rearwardly extending horizontal lug 5 intermediate its ends and a vertical stiffening rib 7 at the rear of the plate extending from the lug to the upper end of the plate. The lug constitutes means for mounting the frame 1 as, for example, on a side frame of the apparatus shown in U.S. Patent 2,897,729.

An air cylinder 9 is secured as indicated at 11 in vertical position in front of the frame plate 3 toward the lower end of plate 3. A piston rod 13 extends from a piston 15 in the cylinder upward through the upper end head of the cylinder and carries a staple clinching anvil generally designated 17 at its upper end. This anvil is of T-shape in horizontal section (see FIG. 3), the stem of the T being designated 19 and the head of the T being designated 21. The head 21 slides in a channel-section guide 23 mounted on the front of frame plate 3 for guiding the anvil for vertical sliding movement. The anvil 17 has a knife-receiving groove 25 at its upper end extending at right angles to plate 3 and two sets of staple-clinching grooves 27 extending at right angles to groove 25.

The stem 19 of the anvil has a vertical slot 29 extending from side-to-side. A pair of plates 31 each having a V-shaped notch 33 in its upper end are mounted for vertical sliding movement on opposite sides of stem 19, these plates being interconnected by upper and lower pins 35 and 37 extending through slot 29. The anvil has a tapped hole 39 extending upward from its lower end receiving the upper end of piston rod 13. This hole has a continuation 41 accommodating a coil compression spring 43 reacting from the upper end of rod 13 against the lower pin 37 to bias plates 31 upward relative to the anvil 17 to the extended position in which plates 31 appear in FIGS. 1 and 2, determined by engagement of the upper pin 35 with the upper end of slot 29. In this extended position of plates 31, the bottoms of the V-shaped notches 33 are above the top of the anvil 17. The plates 31 are movable downward relative to the anvil 17 from this extended position against the bias of spring 43.

A bracket 45 is mounted on the front of frame plate 3 at its upper end. An air cylinder 47 extends vertically upward from this bracket. A piston rod 49 extends vertically downward from a piston 51 in cylinder 47 and carries a plunger generally designated 53 at its lower end. Plunger 53, shown per se in FIG. 12, has an upper stem portion 55 of square cross section having a tapped hole extending downward from its upper end receiving the lower end of piston rod 49, and a lower portion 57 wider than stem portion 55. At opposite sides of lower portion 57, somewhat below the upper end of lower portion 57, there are horizontal ribs 59. T-shaped members 61 are secured to the opposite sides of portion 57 of the plunger 53 immediately above these ribs, with the stems 63 of these T-shaped members projecting laterally outward (see FIGS. 5 and 6). Plate 3 carries a channel-section guide 65 for stem portion 55 of plunger 53 (see FIGS. 1, 2 and 4).

The lower portion 57 of plunger 53 has vertically extending ribs 67 at front and back. Each side of portion 57 has a central vertical groove 71 extending down from horizontal rib 59 to the lower end of the plunger. Accommodated in each groove 71 is a staple driver 73. Each staple driver 73 comprises a relatively thin narrow strip of hard metal, and each is held in its respective groove 71 by a block 75 secured against the respective side of the plunger below the respective rib 59 by screws such as indicated at 77. Each block 75 (which is a block of hard metal) has two thin ribs 79 projecting down from its bottom at opposite sides thereof with a notch 81 between these ribs. The ribs are spaced outward from the staple drivers 73 (see FIG. 6) with the distance from the outside face of driver 73 to the inside face of ribs 79 corresponding to twice the width of a staple blank B, and extend down below the lower end of the plunger 53. The staple drivers 73 extend down below the lower end of the plunger farther than the ribs. Each block 75, with ribs 79 thereon separated by notch 81, constitutes a staple former, as well as constituting means for holding the respective staple driver 73 in its groove 71, and will be henceforth referred to as a staple former. With ribs 79 of each staple former 75 spaced outward from the respective driver 73 as stated, each staple former 75 is adapted to form the fourth blank B1 (FIG. 7) into a staple while driver 73 drives staple S1 at the leading end of the respective chain C.

The lower portion 57 of plunger 53 is guided for vertical sliding movement in a housing designated in its entirety by reference character 83. This housing is mounted in front of frame plate 3 immediately below guide 65 for upper portion 55 of the plunger. It is a two-part housing, consisting of mating front and back parts each designated 85 which have flat vertical engaging faces as indicated at 87. The two parts 85 of housing 83 are held together by screws 89. Parts 85 are formed to provide a vertical opening 91 extending from top to bottom of housing 83. This opening is generally of rectangular cross section with vertical cylindric recesses 93 at opposite sides thereof. Guides 95 made of bronze or other suitable metal are provided in opening 91 at the front and back thereof, being held therein by screws such as indicated at 97. These guides are vertically grooved as indicated at 99 for reception of the ribs 67 at the front and back of lower portion 57 of plunger 53. Stems 63 of the T-shaped members 61 on the plunger extend laterally into recesses 93, which accommodate coil compression springs 101 reacting from the lower ends of recesses 93 against stems 63 to bias the plunger upward (see FIG. 6).

Extending centrally from front to back across the lower end of opening 91 in housing 83 is a bridge piece 103 (see FIGS. 6, 9 and 19). The width of this piece corresponds to the width of lower portion 57 of plunger 53 without the staple formers 75, and is less than the width of opening 91. The bridge piece is held in position at the lower end of opening 91 by screws 104. It has vertical grooves 105 (see FIGS. 6, 10, 11 and 19) at opposite sides thereof aligned with the staple drivers 73. The sides of each groove 105 diverge to some extent for some distance downward from the top of the bridge, then converge as appears in FIG. 9. The bridge piece also has a front-to-back slot 107 for sliding reception of a knife 109 extending downward from the lower end of the plunger 53. The knife is press-fitted in a vertical slot 110 in the plunger, the slot and the knife extending in the central front-to-back plane of the plunger.

Parts 85 of housing 83 are formed to provide two recesses each designated 111 in the bottom of housing 83 extending horizontally inward from opposite sides of the housing to opening 91 in the housing. These recesses are provided for the reception of horizontal guides 113, one of which is shown per se in FIGS. 13–16. Each guide 113 has an inner or forward portion 115 having a width corresponding to the width of recess 111, and an outer or rearward portion 117 wider than portion 115. The length of inner portion 113 corresponds to the distance from one side of the housing 83 to the respective face of bridge piece 103. Each guide 113 is removably held in position with its inner portion 115 extending through the respective recess 111 and into opening 91, with its inner end engaging the respective side of bridge piece 103 by a screw 119 extending from the front of the housing through a hole 121 in the guide and threaded in a tapped hole in housing 83.

Each guide 113 has a bending anvil 123 (shown per se in FIG. 17) guided for sliding movement lengthwise thereon. For this purpose, each anvil 123 has lateral flanges 125 at the bottom slidably received in grooves 127 in side walls 129 on portion 115 of the guide 113. Each bending anvil has a nose 131 at its inner (forward) end somewhat narrower than the main body of the anvil, this nose being narrow enough to slide into and out of the groove 105 in the respective side face of bridge piece 103. The nose has an inclined forward end 133 and a convexly curved top surface 135. The length of the nose at the bottom is substantially equal to three times the width of a staple blank B (and hence three times the width of a staple). Face portions of anvil 123 at opposite sides of the nose are designated 136. Fixed on top of outer portion 117 of each guide 113 is a block 137 having a curved guide surface 139. A coil compression spring 141 received in a recess 143 in each block 137 reacts from the inner end of the recess against the rearward end of the respective anvil 123 to bias the anvil to the forward position thereof in which it appears in FIGS. 6 and 19, wherein the nose 131 extends into the respective groove 105 in bridge piece 103. The nose 131 is slidable within the confines of cheeks 145 at the forward end of guide 113. Stripper plates 147 (one of which is illustrated per se in FIG. 18) are secured as by screws at 148 to the top of each recess 111. Each stripper plate has a pair of stripper fingers 149 extending over nose 131 and terminating short of the path of the respective staple driver 73.

Housing 83 is secured as indicated at 150 to frame plate 3 spaced outward from plate 3 by a spacer 151. A plate 153 is attached to plate 3 in the resultant space. Plate 153 has two inclined arms 155 extending outward at opposite sides of plate 3. Each arm has means such as indicated at 157 at its outer end for holding a coiled chain C of staple blanks B. Each coil is designated CC. Fixed on top of each block 137 is a chain guide 159. Each chain C unwinds from the respective coil CC, extends through the respective chain guide 159 and over the curved guide surface 139 of the respective block, reaching to the respective side face of the bridge piece 103 (see FIGS. 2 and 6). On housing 83 is a plate 161 having lateral projections 163. At each side of the housing is an air cylinder 165. Each of these has its upper end secured to the respective projection 163 and extends downward therefrom. A piston rod 167 extends down from a piston 169 in each cylinder and has a shoe 171 at its lower end for engagement with the portion of chain C on curved surface 139 of block 137. Each cylinder has a spring 173 therein biasing the piston, piston rod and shoe upward, and a port 175 at its upper end for supply and exhaust of air to actuate the piston, piston rod and shoe. Plate 161 is held in position by a cover plate 177, secured by screws 179 to housing 83.

The above-described apparatus replaces unit 245 shown in U.S. Patent 2,897,729 being mounted in position for horizontal passage of the hemmed margin of the bag web over the upper ends of plates 31, with the draw cords D contained in the hems H (see FIGS. 1 and 20) on the web in position for reception in the V-shaped notches 33 in plates 31 on upward movement of the anvil 17 from its lowered retracted position of FIGS. 1 and 2. These notched plates 31 (see FIG. 20) constitute means for pulling a loop L including both cords D from the hem opening HO formed between the ends of adjacent hems H.

Operation is as follows:

It will be understood that each chain C of staple blanks B extends from the respective coil CC through the respective chain guide 159, over the curved guide surface 139 of the respective block 137, and over the respective bending anvil 123 (immediately underneath the respective stripper plate 147) to the inner or forward end of the bending anvil 123. As a result of previous operation at the inner or forward end of each chain C, there will be three formed U-shaped staples S1, S2 and S3 (as in FIG. 7) straddling nose 131 on the respective bending anvil 123. The staple S1 at the forward end of each chain is located in groove 105 in the respective side face of bridge piece 103, in the path of the respective staple driver 73. The staple S2 is located immediately outward of the path of the staple driver, with staple S3 next in order. Staple blank B1 next to staple S3 is located in the path of staple-forming ribs 79 on staple former 75, extending transversely over the outer end portion of nose 131 immediately forward of face portions 136 of anvil 123.

Compressed air is admitted to the lower end of cylinder 9 and air is vented from the upper end of cylinder 9 under control of a suitable conventional valve (not shown) to drive the anvil 17 upward from its lowered retracted position shown in FIGS. 1 and 2. The anvil 17 and plates 31 thereon move upward through opening HO in the bag web, as shown in FIG. 20, opening HO corresponding to an opening such as indicated at 109 in U.S. Patent 2,897,729, the bag web being stationary at this time as will be clear from said patent. As the anvil moves upward, the draw cords D are gathered in the notches 33 in plates 31, and a loop L including portions of both cords is pulled from the opening as shown in FIG. 20. This corresponds to the pulling of the loop L shown in said patent, except that the loop is pulled up out of the hems H instead of being pulled laterally outward as shown in said patent. Plates 31, with the draw cords received in notches 33 thereof, move up with anvil 17 until their upper ends engage the bottom of housing 83. The cords D are then confined in the bottoms of the notches 33 in position directly above and extending lengthwise of the staple-clinching grooves 27 in the top of anvil 17 as shown in FIG. 20. The anvil 17 then continues its upward movement, spring 43 yielding to permit this, to its fully raised operative position wherein the draw cords are received in grooves 27 and anvil 17 engages the bottom of housing 83. Groove 25 in the top of anvil 17 registers with knife slot 107 in bridge piece 103.

When anvil 17 has been raised to its stated operative position, compressed air is admitted to the upper end of cylinder 47 and air is vented from the lower end of cylinder 47 under control of a suitable conventional valve (not shown) to drive plunger 53 downward. Cylinder 47 is preferably an impact type of cylinder so that plunger 53 is driven downward at relatively high speed. As plunger 53 moves downward, knife 109 severs the loop. Each staple driver 73 engages the top of the U-shaped staple S1 at the forward end of the respective chain C and drives this staple S1 down against the raised anvil 17. The lower ends of the two staples S1 thus driven by the two staple drivers 73 are turned in by the staple-clinching grooves 27 in the top of anvil 17, and are thus clinched around the cords on opposite sides of the point where the loop was severed by knife 109. Pressure in cylinder 9 is sufficient to maintain anvil 17 raised for clinching of the staples, with cushioned action due to yielding of the anvil 17 against pressure in cylinder 9.

As each staple S1 is driven downward by the respective staple driver 73, the staple S1 engages the inclined forward end 133 of the nose 131 on the respective bending anvil 123 and cams the latter rearward against the bias of the respective return spring 141. Each anvil 123 is thereby moved back one staple width away from its forward position. As this occurs, air is supplied to cylinder 165 under control of a suitable conventional valve (not shown) to hold shoes 171 down in engagement with chains C to keep them from being moved rearward by anvils 123. Toward the end of the downward stroke of plunger 53, staple-forming ribs 79 on each staple former 75 engage the ends of the respective blank B1 on opposite sides of the respective anvil nose 131, and bend these ends down to form blank B1 into the U-shaped staple S4.

Upon completion of the clinching of the staples and the cutting of the cords, compressed air is supplied to the upper end of cylinder 9 and air is vented from its lower end to retract anvil 17 downward. Compressed air is supplied to the lower end of cylinder 47 and air is vented from its upper end to retract plunger 53 upward, thereby retracting the staple drivers 73, the staple formers 75 and knife 109. Fingers 149 on each stripper plate 147 hold the respective staple S4 down to strip it from within the notch 81 between the ribs 79 on the respective staple former 75. Cylinders 165 are then vented to release the chains C for forward movement. Each bending anvil 123 is then moved forward by the respective return spring 141 to the point where nose 131 on the anvil re-enters the respective groove 105 in bridge piece 103 and engages the base of the groove. As each bending anvil moves forward, face portions 136 thereof engage the respective staple S4 just formed, and advance the respective chain C one staple width. This brings each staple S4 into the S3 position, each staple S3 into the S2 position, advances each previously formed staple S2 to the S1 position, and brings another blank B into the B1 position for being formed to U-shape on the next operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Stapling apparatus operable to form and drive staples from a chain of staple blanks, each blank comprising a metal strip, the blanks being held together in articulated chain fashion extending transversely of the length of the chain, each blank being separable from the chain, said stapling apparatus comprising an anvil having a nose at one end constituting its forward end around which a blank may be bent to form a staple, means mounting said anvil for rearward and forward movement away from and back to a forward position in the direction of the length of the chain, means for guiding a chain of staple blanks over the anvil with the chain extending to the forward end of the anvil, a plunger carrying a driver for driving a staple formed from the blank at the leading end of the chain and also carrying a staple former for forming another blank in the chain into a new staple, means for operating the plunger through a driving stroke and then a return stroke, the nose of said anvil having an inclined forward end engageable by the staple being driven by the driver on a driving stroke of the plunger for moving the anvil rearward one blank width, said anvil having face portions engageable behind the new staple formed by the staple former on a driving stroke of the plunger, and spring means for returning the anvil forward one blank width on a return stroke of the plunger to advance the chain one blank width by engagement of said face portions with the new staple.

2. Stapling apparatus as set forth in claim 1 wherein said staple former is carried by the plunger in position to bend the fourth blank from the leading end of the chain into the new staple on a driving stroke of the plunger.

3. Stapling apparatus as set forth in claim 1 further comprising means for holding the chain against rearward movement on rearward movement of the anvil.

4. Stapling apparatus as set forth in claim 1 wherein the staple former is removably secured to the plunger and holds the driver in assembly with the plunger.

5. Stapling apparatus operable to form and drive staples from a chain of staple blanks, each blank comprising a metal strip, the blanks being held together in articulated chain fashion extending transversely of the length of the chain, each blank being separable from the chain: said stapling apparatus being adapted to drive a staple formed from the blank at the leading end of the chain, and comprising means for forming a blank trailing the leading end of the chain into a staple and for advancing the chain one blank width, said forming and advancing means comprising an anvil around which said trailing blank may be bent to form it into a staple, means mounting the anvil for rearward and forward movement away from and back to a forward position in the direction of the length of the chain a distance corresponding to the width of a blank, a staple former for bending said trailing blank into a staple around the anvil, means for driving the staple formed from the blank at the leading end of the chain, and moving the anvil rearward one blank width, and means for then returning the anvil to its said forward position, said anvil being engageable with a staple formed around the anvil for advancing the chain one blank width following each driving operation to bring the leading end of the chain into position for driving of the next staple.

6. Stapling apparatus as set forth in claim 5 wherein said staple former is spaced the width of three blanks from the driving means so as to bend the fourth blank from the leading end of the chain into a staple upon operation of the driving means.

7. Stapling apparatus operable to form and drive staples from a chain of staple blanks, each blank comprising a metal strip, the blanks being held together in articulated chain fashion extending transversely of the length of the chain, each blank being separable from the chain: said stapling apparatus comprising an anvil around which a blank may be bent to form a staple, means mounting said anvil for rearward and forward movement away from and back to a forward position in the direction of the length of the chain, means for guiding a chain of staple blanks over the anvil with the chain extending to the forward end of the anvil, a driver for driving a staple formed from the blank at the leading end of the chain, said driver being movable through a driving stroke and then a return stroke, a staple former movable with the driver for bending another blank in the chain around the anvil to form it into a new staple upon a driving stroke of the driver, said driver upon a driving stroke thereof being engageable with the anvil to move it rearward one blank width, means for returning said anvil forward one blank width upon a return stroke of the driver, and said anvil being engageable with the new staple to advance the chain one blank width upon such return.

8. Stapling apparatus as set forth in claim 7 wherein the staple former is spaced the width of three staple blanks from the driver so as to bend the fourth blank from the leading end of the chain into a new staple upon a driving stroke of the driver.

9. Stapling apparatus as set forth in claim 7 wherein said anvil has an inclined end engageable by the staple being driven by the driver for moving the anvil rearward one blank width, and wherein spring means is provided for returning the anvil.

10. Stapling apparatus as set forth in claim 7 wherein said driver and staple former are conjointly movable and the staple former is spaced the width of three staple blanks from the driver so as to bend the fourth blank from the leading end of the chain into a new staple upon a driving stroke of the driver.

11. Apparatus for gathering portions of two draw cords exposed in an opening in hems on a draw cord bag forming web, pulling a loop including portions of both cords from the opening, severing the loop, and stapling the cords together on opposite sides of the point where the loop is severed, and operable to form and drive staples from each of two chains of staple blanks, each blank comprising a metal strip, the blanks being held together in articulated chain fashion extending transversely of the length of the chain, each blank being separable from the chain: said apparatus comprising a staple clinching anvil mounted for movement between a retracted and an operative position, means for moving said clinching anvil between said positions, means associated with said clinching anvil for gathering portions of the draw cords exposed in an opening in the hems on the draw cord bag forming web and pulling a loop including portions of both cords from the opening on movement of said clinching anvil to operative position, means for severing the loop, two stapling units for driving two staples each formed from the blank at the leading end of a respective chain against the clinching anvil when the latter is in operative position for clinching these staples around the cords on opposite sides of the point where the loop is severed, each stapling unit comprising means for forming a blank trailing the leading end of the respective chain into a staple and for advancing the respective chain one blank width, said forming and advancing means comprising a bending anvil around which said trailing blank may be bent to form it into a staple, means mounting the bending anvil for rearward and forward movement away from and back to a forward position in the direction of the length of the chain a distance corresponding to the width of a blank, and a staple former for bending said trailing blank into a staple around the anvil; and means including a staple driver for driving the staple formed from the blank at the leading end of the respective chain against the clinching anvil when the latter is in operative position for clinching the staple around the cords on the respective side of the point where the loop is severed and for moving the bending anvil rearward one blank width, and means for then returning the bending anvil to its said forward position, said bending anvil being engageable with a staple formed therearound for advancing the respective one blank width following each driving operation to bring the leading end of the chain into position for driving of the next staple in the chain.

12. Apparatus as set forth in claim 11 wherein said clinching anvil is mounted for reciprocation between its retracted and operative positions and wherein said drivers and staple formers are mounted for conjoint reciprocation toward and away from the clinching anvil.

13. Apparatus as set forth in claim 12 wherein each staple former is spaced the width of three blanks from the respective driver so as to bend the fourth blank from the leading end of the respective chain into a staple upon a driving stroke of said drivers and staple formers.

14. Stapling apparatus as set forth in claim 13 wherein each anvil has an inclined end engageable by the staple being driven by the respective driver for moving the anvil rearward one blank width, and wherein spring means is provided for returning each bending anvil.

References Cited in the file of this patent
UNITED STATES PATENTS

| | | |
|---|---|---|
| 942,904 | Hoxie | Dec. 14, 1909 |
| 1,377,295 | Wentworth | May 10, 1921 |
| 1,712,843 | Richardson | May 14, 1929 |
| 2,325,322 | Jackson | July 27, 1943 |
| 2,563,173 | Jackson | Aug. 7, 1951 |